US010099230B2

(12) United States Patent
Lacher et al.

(10) Patent No.: US 10,099,230 B2
(45) Date of Patent: *Oct. 16, 2018

(54) THROUGHFLOW CONTROLLER

(71) Applicant: Neoperl GmbH, Mullheim (DE)

(72) Inventors: Wolf-Dieter Lacher, Mullheim (DE); Alexander Stein, Ihringen (DE)

(73) Assignee: NEOPERL GMBH, Mullheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/447,999

(22) Filed: Mar. 2, 2017

(65) Prior Publication Data

US 2017/0173604 A1      Jun. 22, 2017

Related U.S. Application Data (63) Continuation of application No. 14/342,890, filed as application No. PCT/EP2012/003749 on Sep. 6, 2012, now Pat. No. 9,644,355.

(30) Foreign Application Priority Data

Sep. 6, 2011   (DE) .................... 20 2011 105 376 U (51) Int. Cl.
    *B05B 1/30*    (2006.01)
    *E03C 1/084*   (2006.01)

(52) U.S. Cl.
    CPC ............ *B05B 1/3026* (2013.01); *E03C 1/084* (2013.01)

(58) Field of Classification Search
    CPC ............ E03C 1/08; E03C 1/084; E03C 1/086; G05D 7/012; Y10T 137/776; Y10T 137/7766; Y10T 137/777; B05B 1/3006; B05B 1/32; B05B 1/3033; B05B 1/323; B05B 1/30; B05B 1/3026
See application file for complete search history.

(56) References Cited

U.S. PATENT DOCUMENTS

| | | | | |
|---|---|---|---|---|
| 3,697,002 A | * | 10/1972 | Parkison | B05B 1/3006 137/504 |
| 4,562,960 A | * | 1/1986 | Marty | E03C 1/084 138/45 |
| 5,405,089 A | * | 4/1995 | Heimann | B05B 1/185 239/533.14 |
| 5,730,361 A | | 3/1998 | Thonnes | |

(Continued)

FOREIGN PATENT DOCUMENTS

| | | |
|---|---|---|
| DE | 102010006376 A1 | 8/2011 |
| DE | 202010007835 U1 | 11/2011 |
| WO | 2011006082 A1 | 1/2011 |

*Primary Examiner* — Alexander Valvis
*Assistant Examiner* — Christopher R Dandridge
(74) *Attorney, Agent, or Firm* — Volpe and Koenig, P.C.

(57) ABSTRACT

A sanitary insert part includes an insert housing, which includes in a housing interior thereof a functional element that controls throughflow and that has at least one throughflow orifice. At least one throughflow opening is delimited by a peripheral wall, the shape of which can be changed against a restoring force as a result of the pressure of the inflowing water in such a manner that the at least one throughflow orifice has a variable orifice cross section which can be changed, in dependence on the pressure of the inflowing water, between an open position and a minimized position having a reduced orifice cross section by comparison.

19 Claims, 6 Drawing Sheets

(56) References Cited

U.S. PATENT DOCUMENTS

| | | |
|---|---|---|
| 6,739,527 B1 | 5/2004 | Chung |
| 7,004,410 B2 | 2/2006 | Li |
| 2003/0062426 A1 | 4/2003 | Gregory |
| 2004/0118948 A1 | 6/2004 | Drennow |

\* cited by examiner

Fig. 19

THROUGHFLOW CONTROLLER

CROSS REFERENCE TO RELATED APPLICATIONS

This application is a continuation of U.S. patent application Ser. No. 14/342,890, filed Mar. 5, 2014, which is a 371 National Stage Entry of PCT/EP2012/003749, filed Sep. 6, 2012, the entire contents of which are incorporated by reference as if fully set forth.

BACKGROUND

The invention relates to a sanitary insert part having an insert housing, which has in the housing interior thereof a functional element that controls throughflow and that has at least one throughflow orifice.

A sanitary insert part of the type mentioned in the introduction is known for example as a jet regulator. The previously known jet regulators routinely have an insert housing which can be mounted, either directly or with the aid of an outlet mouthpiece, on the water outlet of a sanitary outlet fitting. A jet splitter is provided in the housing interior of the insert housing and has throughflow orifices, which divide the inflowing water into a plurality of individual jets. The individual jets produced in the throughflow orifices experience such an acceleration that a negative pressure is produced on the outflow side of the jet splitter. With the aid of this negative pressure produced on the outflow side of the jet splitter, ambient air is drawn into the housing interior of the insert housing and can be mixed thoroughly there with the individual jets before the water mixed thoroughly with air in this way flows out from the jet regulator housing as a homogeneous, non-splashing and effervescent complete jet.

Throughflow rate controllers have already been created so that the water, independently of the water pressure, does not exceed a specific fixed water volume per unit of time. Throughflow rate controllers that can be arranged upstream of a jet regulator in the throughflow direction or that can be arranged between such a jet regulator and an add-on screen on the inflow side are thus already known. Such a functional unit comprised of throughflow rate controller and jet regulator has a comparatively large installed length however or is structured in a complex manner and from many parts.

SUMMARY

In particular, the object is therefore to create a sanitary insert part of the type mentioned in the introduction which, independently of pressure, can limit the water flowing through to a fixed maximum throughflow volume per unit of time and which is nevertheless structured in a comparatively compact and simple manner.

With the sanitary insert part of the type mentioned in the introduction, the solution to this problem according to the invention consists, in particular in that at least one throughflow orifice is delimited by a peripheral wall, the shape of which can be changed against a restoring force as a result of the pressure of the inflowing water in such a way that the at least one throughflow orifice has a variable orifice cross section which can be changed, in accordance with the pressure of the inflowing water, between an open position and a minimum position having reduced orifice cross section by comparison.

The insert part according to the invention, which can be interposed in a water line or can be mounted on the water outlet of a sanitary outlet fitting, has, in the housing interior of its insert housing, a functional element that controls throughflow. This functional element has at least one throughflow orifice, of which at least one throughflow orifice is delimited by a peripheral wall, the shape of which can be changed against a restoring force as a result of the pressure of the inflowing water in such a way that the at least one throughflow orifice has a variable orifice cross section which can be changed, in accordance with the pressure of the inflowing water, between an open position and a minimum position of reduced orifice cross section by comparison. With increasing water pressure, the orifice cross section of the at least one throughflow orifice is thus likewise increasingly reduced in such a way that, independently of the water pressure, a specific fixed maximum volume flow rate (volume per unit of time) is not exceeded. With decreasing water pressure, the orifice cross section of the at least one throughflow orifice is increasingly enlarged again, such that, with a low initial pressure, the orifice cross section corresponding to the open position is provided. The functional element that controls throughflow provided in the insert part according to the invention makes an additional throughflow rate controller superfluous and allows a compact and simple embodiment of the sanitary insert part according to the invention.

In accordance with a preferred embodiment of the invention the functional element is formed at least in two parts and comprises at least one functional element, comprising the at least one peripheral wall delimiting at least one throughflow orifice, and a support part bearing the at least one functional part.

If at least one spring element effective between the functional part and support part is to be dispensed with, it is advantageous if the support part bearing the at least one functional part is produced from a material that is dimensionally stable compared with the functional part on the inflow side and/or has an at least partly higher component part stiffness by comparison.

In accordance with a development according to the invention a water pressure acting on the inflow side of the functional element at least in the region of the at least one throughflow orifice in the throughflow direction causes a change in shape of the functional part or causes a material displacement at the functional part that can be converted into a radial constriction movement of the at least one peripheral wall delimiting at least one throughflow orifice. In the case of this developing embodiment, the water pressure acting at least in the region of the at least one throughflow orifice on the inflow side of the functional element in the throughflow direction may cause a compression of the functional element and thus a change in shape or a material displacement that can be converted simultaneously into a corresponding radial constriction movement of the at least one peripheral wall delimiting at least one throughflow orifice and thus into a reduction of the clear orifice cross section.

Here, it may be advantageous if the change in shape or material displacement caused by the water pressure is an at least partial thickness reduction, cross section reduction, height reduction or compression of the functional part.

In accordance with a preferred embodiment according to the invention the at least one peripheral wall delimiting a throughflow orifice has a shaping that converts an application of pressure, caused by the water pressure, in the axial direction into a radial constriction movement of this peripheral wall. Due to the particular shaping of the peripheral walls each delimiting a throughflow orifice, the function unit according to the invention can limit the throughflow in a defined or fixed range.

Here, in accordance with particularly simple and functionally reliable exemplary embodiments, in order to convert an application of pressure in the axial direction into a radial constriction movement, the at least one peripheral wall delimiting a throughflow orifice either has, on the outer periphery at its free end region as oriented in the throughflow direction, a run-on bevel that cooperates with a mating bevel on the support part, or has a constriction with a peripheral bending zone protruding into the throughflow orifice. In these preferred exemplary embodiments the peripheral walls each delimiting a throughflow orifice have a shaping that converts an application of pressure, caused by the water pressure, in the axial direction into a defined radial constriction movement of these peripheral walls.

It is expedient if the at least one peripheral wall delimiting at least one throughflow orifice is formed as a nozzle-shaped formation of the functional part.

So that the orifice cross section of the at least one throughflow orifice changes as a result of the pressure of the inflowing water, it may be advantageous if the at least one nozzle-shaped formation of the functional part dips into an insert orifice in the support part.

So that the orifice cross section of the at least one throughflow orifice changes as a result of the pressure of the inflowing water, it may be advantageous if the at least one insert orifice tapers, preferably conically, in the throughflow direction, thus forming a mating bevel, in such a way that an axial feed movement of the nozzle-shaped formation can be converted into a radial constriction movement, for example at least in the free end region of the formation. If the water pressure acting on the functional part on the inflow side causes an axial feed movement also of the at least one nozzle-shaped formation formed integrally on the functional part, this axial feed movement is simultaneously converted into a radial constriction movement in the region of the at least one formation in such a way that the orifice cross section of the throughflow orifice changes increasingly, in accordance with the pressure of the inflowing water, from an open position into a minimum position of reduced orifice cross section.

In accordance with an alternative embodiment of the invention the at least one nozzle-shaped formation has a shaping that is flexible in the axial direction and therefore has a component part stiffness that is reduced in such a way that an axial compression of the nozzle-shaped formation can be converted into a radial constriction movement in the region of the formation.

So that the functional element used in accordance with the invention can limit the volume flow rate to a fixed maximum value, it is expedient if the inflow-side end edge of the insert orifice in the support part, said insert orifice receiving a formation, delimits the pressure-induced axial relative movement of the functional part. Since the inflow-side end edge of the insert orifice provided in the support part delimits the pressure-induced axial relative movement of the functional part, the constriction movement in the region of the formation is also delimited in a defined manner in such a way that the orifice cross section cannot be any smaller than a minimum orifice cross section.

So that an axial relative movement of the formation can be converted into a radial constriction movement, it may be advantageous if the free end edge of at least one formation rests against a stop of the support part, preferably against a stop face.

The simple constructional embodiment and the possibility for easy production of the functional element used in accordance with the invention is further promoted if the functional part has a disk- or plate-shaped main body and/or if the functional part has a plurality of formations on the outflow side.

So that the peripheral wall provided in the functional element and delimiting at least one throughflow orifice can move back practically automatically into its form corresponding to the open position of the at least one throughflow orifice in the event of decreasing water pressure as a result of the restoring force acting on the peripheral wall, it is provided in accordance with a preferred embodiment for at least one spring element to serve as restoring force and for the restoring force of the at least one spring element to be transmittable to at least two sub-regions of the dimensionally flexible peripheral wall, said sub-regions being mutually distanced in the throughflow direction. This return spring or similar spring element serving as restoring force can act directly on the peripheral wall delimiting at least one throughflow orifice; it is also possible however for the peripheral wall to be held on two mutually distanced component parts which are in turn held at a distance by at least one spring element. Here, the at least one spring element can be formed as a coil spring or as a rubbery-elastic spring element.

In accordance with an embodiment according to the invention that is to be formed in a particularly simple and compact manner the restoring component part stiffness of the peripheral wall of the at least one throughflow orifice and/or the inherent resilience of the material used for the at least one peripheral wall is/are provided as restoring force. In this preferred embodiment a number of required spring elements can be reduced, or such spring elements can also be dispensed with entirely. Such an embodiment therefore promotes the simple construction and production of the functional element provided in accordance with the invention and facilitates the compact and space-saving embodiment thereof.

In accordance with a particularly advantageous development according to the invention the sanitary insert part is formed as a jet regulator, of which the purpose is to form a consolidated complete jet at the water outlet of a sanitary outlet fitting.

With such an embodiment according to the invention, it may be advantageous if the functional element of the insert part formed as a jet regulator is formed as a jet splitter that controls the throughflow rate. This jet splitter has the purpose of dividing the inflowing water in the housing interior of the insert housing firstly into a plurality of individual jets, before these individual jets are then combined again and formed into a consolidated complete jet at the water outlet of a sanitary outlet fitting.

Where necessary, the insert part according to the invention can be embodied advantageously as an non-aerated jet regulator. In accordance with a particularly advantageous and preferred embodiment according to the invention however, the sanitary insert part is formed as an aerated jet regulator and at least one aeration opening is provided on the outflow side of the jet splitter on the inner periphery of the insert housing and connects the housing interior to the ambient air. The water flowing to the jet splitter located in the housing interior of the insert housing experiences a speed increase in the region of the jet splitter, said speed increase causing a negative pressure on the outflow side of the jet splitter in accordance with Bernoulli's equation. Due to the negative pressure formed on the outflow side of the jet splitter, ambient air is drawn in via the at least one aeration opening provided on the housing periphery and can be mixed subsequently in the housing interior of the insert housing with the water flowing through so as to form an effervescent water jet.

In order to additionally reduce the constructional and production outlay associated with the functional element, it is expedient if the functional element is formed integrally on an inflow-side housing part of a jet regulator housing and if the inflow-side housing part can be connected, preferably detachably, to an outflow-side housing part.

It is also possible however for the functional element and preferably the functional part thereof to be embodied as an insert part that can be inserted into the insert housing and in particular into an inflow-side housing part, and for at least one sealing lug or similar sealing protrusion to be provided on the insert housing or on the housing part and/or on the peripheral edge of the functional element or functional part formed on the inflow side as an insert part, said lug or protrusion providing a radial seal between the insert housing or housing part on the one hand and the functional element or functional part thereof on the other hand. This at least one sealing lug prevents a leakage of at least water on the sanitary insert part according to the invention.

It is expedient if at least one insert part of a jet control arrangement can be inserted into the outflow-side housing part.

In accordance with a preferred embodiment according to the invention the outlet end face of the outflow-side housing part forms a honeycomb-cell-like orifice structure, a grid structure or a net structure, said structure being embodied as a flow rectifier.

So that the functional part consisting of resilient material can change its shape as a result of the pressure of the inflowing water or so that the material of said functional part can be displaced, it is expedient if a gap provided between the functional part and the support part is connected via at least one ventilation channel to the ambient air and preferably to the ambient air in the housing interior of the insert housing.

Here, in accordance with a preferred embodiment according to the invention the at least one ventilation channel penetrates the support part and has a channel opening, which is provided on the outflow side of the support part. Since a negative pressure is routinely produced on the outflow side of the support part when the water flows through the throughflow openings, the pressure difference is greatest even in the region of this channel opening, such that the effect of the ventilation channel is additionally promoted.

It is also possible however, either additionally or alternatively, for the at least one ventilation channel to penetrate the functional part and to have a channel opening facing away from the gap, said channel opening being provided on the inflow side of the functional part.

In order to be able to easily change the orifice cross section of any throughflow orifice in accordance with the pressure of the inflowing water, it is provided in accordance with a preferred development according to the invention for the functional part and preferably the disk- or plate-shaped main body thereof, in an unloaded starting position, to be distanced from the support part and, under the pressure of the inflowing water, to approach the support part or bear against the support part against the restoring component part stiffness and/or the inherent resilience of at least one subregion of the functional part.

In order to limit a restoring force effective in the starting position to the main body of the functional part, said main body being moved in the direction of the support part as a result of the pressure of the inflowing water, it is advantageous if the functional part is held non-displaceably at its outer peripheral edge region in the insert housing.

Here, in accordance with a preferred embodiment according to the invention, the functional part rests, via its outer peripheral edge region, on the adjacent peripheral edge region of the support part.

So that the functional part movable between an unloaded starting position distanced from the support part on the one hand and a position pushed in the direction of the support part on the other hand can be moved back into the starting position with subsiding water pressure, it is advantageous if at least one preferably pin-shaped spacer is provided between the support part and the functional part and, under the pressure of the inflowing water, causes a resilient deformation of the functional part, said deformation being effective as restoring force. This spacer, for example, can be formed integrally in one piece on the outflow side of the functional part and may likewise be produced from resilient material, such that a spacer of this type that is pre-tensioned or acted on by pressure exerts a rubbery-elastic spring effect. In accordance with an advantageous exemplary embodiment according to the invention, at least one pin-shaped spacer is integrally formed in one piece on the functional part, on the outflow side thereof, and, under the pressure of the inflowing water, experiences a deformation acting as restoring force.

By contrast, in accordance with another embodiment according to the invention, the at least one spacer is formed integrally in one piece on the inflow side of the support part. Here, it may be advantageous if the spacer engages or dips via its free pin end into a hat-shaped formation of the functional part and if the preferably thickness-reduced peripheral wall of the hat-shaped formation can be stretched in a rubbery-elastic manner by the functional part moved under pressure in the direction of the support part.

In accordance with a particularly advantageous embodiment consisting of a reduced number of component parts, the peripheral edge region of the functional part resting on the adjacent peripheral edge region of the support part is formed as a ring seal between the insert part and an inflow-side mating surface of an outlet fitting connectable to the insert part.

So that the peripheral edge region of the functional part serving as a ring seal cannot detach and deform unintentionally, for example as a result of a rotary movement, during assembly of the insert part according to the invention on the water outlet of a sanitary outlet fitting, it is expedient if the outer peripheral edge region of the functional part and the adjacent peripheral edge region of the support part can be fixed detachably to one another.

Here, in accordance with a preferred embodiment according to the invention, the outer peripheral edge region of the functional part engages under at least one undercut on the adjacent peripheral edge region of the support part, and a detaching movement of the peripheral edge region, engaging under the undercut, of the functional part can be blocked by means of an inflow-side component part insertable at least in regions into the functional part, in particular by means of an add-on screen. Due to the component part inserted into the functional part, said component part possibly being an add-on screen for example, the peripheral edge region of the functional part embodied as a ring seal is held in its position, in which this peripheral edge region of the functional part engages under the undercut provided on the support part.

So that the run-on bevel provided on the free end region of any peripheral wall and formed for example by a conical tapering of the free end region of a nozzle-shaped formation can move over the corresponding mating bevel on the support part and can deform without being opposed by interfering frictional forces, it is advantageous if the at least one insert orifice in the support part, in its conically tapering orifice portion, has slide formations that are distanced from one another in the peripheral direction, in particular are strip-shaped, are oriented with their longitudinal extension toward the orifice opening, and are acted on by the free end region of a nozzle-shaped formation of the functional part.

BRIEF DESCRIPTION OF THE DRAWINGS

Developments according to the invention will emerge from the description in conjunction with the drawings. Preferred embodiments according to the invention will be presented in greater detail hereinafter on the basis of the drawing, in which.

DETAILED DESCRIPTION OF THE PREFERRED EMBODIMENTS

Three different embodiments 1, 100 and 101 of a sanitary insert part and of the main constituent parts thereof are illustrated in FIGS. 1 to 8, FIGS. 9 to 16 and FIGS. 17 to 20. The sanitary insert parts 1, 100, 101 have an insert housing 2, which can be mounted directly or (as here) with the aid of an outlet mouthpiece (not shown further) on the water outlet of a sanitary outlet fitting. A functional element 3 formed as a jet splitter is provided in the housing interior of the insert housing 2 and has a plurality of throughflow orifices 4, which divide the inflowing water into a corresponding plurality of individual jets.

At least one throughflow orifice 4 and preferably (as here) all throughflow orifices 4 of the functional element 3 have a clear orifice cross section free from obstacles and are delimited by a peripheral wall, the shape of which can be changed against a restoring force as a result of the pressure of the inflowing water in such a way that the at least one throughflow orifice 4 has a variable orifice cross section which can be changed, in accordance with the pressure of the inflowing water, between an open position and a minimum position having a reduced orifice cross section by comparison. Here, the restoring component part stiffness of the at least one peripheral wall delimiting at least one throughflow orifice 4 and/or the inherent resilience of the material used for the at least one peripheral wall is provided as restoring force. With increasing water pressure, the orifice cross section is thus likewise increasingly reduced in such a way that, independently of the water pressure, a specific fixed maximum volume flow rate is not exceeded. With decreasing water pressure, the orifice cross section is increasingly enlarged again, such that, with a low initial pressure, the orifice cross section corresponding to the open position is provided. The functional element 3 formed as a jet splitter thus makes an additional throughflow rate controller superfluous and can additionally divide the inflowing water into a plurality of individual jets, wherein the functional element 3 substantially promotes the compact and simple embodiment of the insert parts 1, 100, 101 illustrated here.

The throughflow-controlling functional element 3 has a plurality of throughflow orifices 4, which are formed so as to promote flow and/or in a nozzle-shaped manner. Due to the high number of throughflow orifices 4 in the functional element 3 and/or due to the flow-promoting embodiment of these throughflow orifices 4, a noise-generating stall is prevented in this region of the component parts 1, 100, 101, and an undesirable development of noise is thus avoided. The functional element 3 of the sanitary insert parts 1, 100, 101 thus combines within itself the function of an effective jet splitting on the one hand and an effective throughflow rate control on the other hand.

Figures 3, 4, 5, 6, 7, 8:
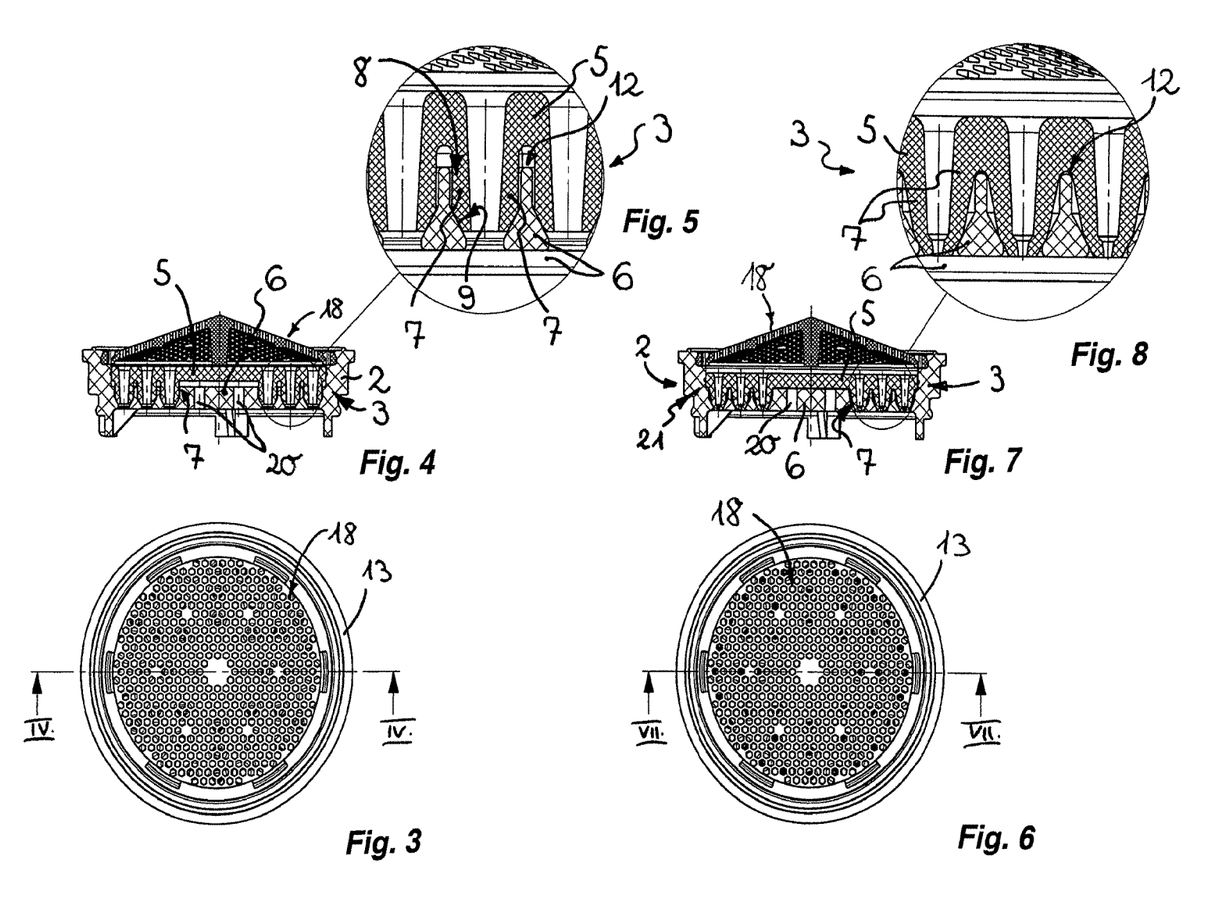
FIG. 3 shows a plan view on the inflow side of the inflow-side housing part of the jet regulator according to FIGS. 1 to 2, said housing part being connected to the functional element formed as a jet splitter.
FIG. 4 shows a longitudinal section through the plane of section IV-IV in FIG. 3 of the inflow-side housing part from FIG. 3 connected to the functional element serving as a jet splitter.
FIG. 5 shows a detailed longitudinal section of the functional element shown in FIG. 4 in the open position of the throughflow orifices thereof.
FIG. 6 shows a plan view on the inflow side of the inflow-side housing part of the sanitary insert part according to FIGS. 1 to 3, said housing part being connected to the functional element.
FIG. 7 shows a longitudinal section through the plane of section VII-VII from FIG. 6 of the inflow-side housing part connected to the functional element serving as a jet splitter.
FIG. 8 shows a detailed longitudinal section of the functional element already shown in FIG. 7 with the throughflow orifices thereof in the minimum position.
Figures 11, 12, 13, 14, 15, 16:
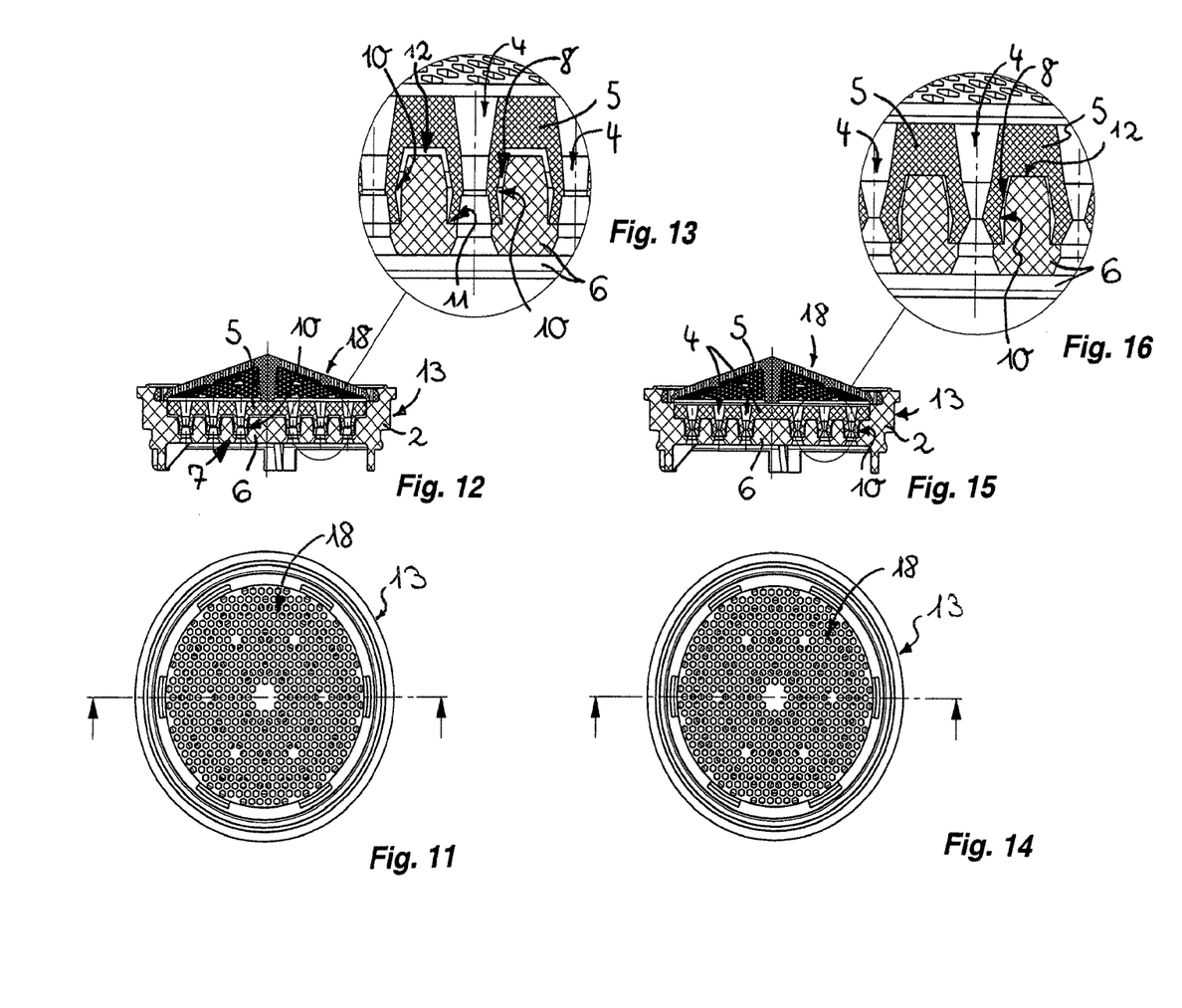
FIG. 11 shows a plan view on the inflow side of the inflow-side housing part of the sanitary insert part according to FIGS. 9 and 10, said housing part being connected to the functional element.
FIG. 12 shows a longitudinal section through the plane of section XII-XII in FIG. 11 of the inflow-side housing part of the sanitary insert part according to FIGS. 9 and 10 formed as a jet regulator, said housing part being connected to the functional element.
FIG. 13 shows a detailed longitudinal section of the functional element from FIG. 12 formed as a jet splitter in the open position of the throughflow orifices thereof.
FIG. 14 shows a plan view on the inflow side of the inflow-side housing part of the sanitary insert part according to FIGS. 9 and 10 formed as a jet regulator, said housing part being connected to the functional element serving as a jet splitter.
FIG. 15 shows a longitudinal section through the plane of section XV-XV in FIG. 14 of the housing part from FIG. 14, said housing part being connected to the functional element formed as a jet splitter.
FIG. 16 shows a detailed longitudinal section of the functional element from FIGS. 14 and 15 serving as a jet splitter in the minimum position of the throughflow orifices thereof.

From a comparison of FIGS. 5 and 8 on the one hand and of FIGS. 13 and 16 on the other hand, which show, by way of example, the throughflow orifices 4 provided in the functional element 3 in their open position and in their minimum position having a reduced orifice cross section by comparison, it is clear that a water pressure acting on the inflow side of the functional element 3 at least in the region of the throughflow orifices 4 in the throughflow direction causes a change in shape, and here a height reduction, of the functional element 3, which can be converted into a radial constriction movement of the throughflow orifices 4.

The functional element 3, formed as a jet splitter, of the insert parts 1, 100, 101 illustrated here is designed for this purpose at least in two parts and has a functional part 5 made of resilient material and/or having a partially reduced component part stiffness and also has a support part 6, bearing the functional part 5 and formed of a material that is dimensionally stable by comparison. The functional part 5 has a disk- or plate-shaped main body 30, on the outflow side of which a plurality of nozzle-shaped formations 7 protrude, which each form a peripheral wall delimiting a throughflow orifice 4. Each of these nozzle-shaped formations 7 protrudes into an insert orifice 8 in the support part 6. Due to the number of throughflow orifices 4 in the functional element 3 and/or due to the shaping of the insert orifices 8 in the support part 6, said insert orifices receiving the formations 7, the volume flow rate of the functional element 3 used in the sanitary insert parts 1, 100, 101 can be changed. It can be seen in FIGS. 1, 2, 4, 7 and 20 that, for example, the support part 6 of the functional element 3 may comprise at least one ventilation channel having a channel opening 20, which here connects the gap 22 arranged between the functional part 5 and support part 6 to the region of the housing interior of the insert part 1 arranged on the outflow side of the functional element 3. This at least one ventilation channel counteracts an excessively fixed adhesion of the functional part 5, formed here as a covering, to the support part 6, said adhesion otherwise potentially impairing the return movement of the functional part 5 into the open position of the functional element 3. Due to the at least one channel opening 20, leakage water located in the gap 22 between the function component 5 and support part 6 can also drain off. The functional part 5 of the functional element 3 used in the insert part 1 can be produced for example from silicone or from another resilient material, said material having a comparatively low material stiffness.

It is indicated in FIGS. 1 to 18 that the at least one peripheral wall delimiting a throughflow orifice 4 has a shaping that converts an application of pressure, caused by the water pressure, in the axial direction into a radial constriction movement of this peripheral wall. In the exemplary embodiments illustrated in FIGS. 1 to 8 and 17 to 18, the peripheral walls each delimiting a throughflow orifice 4 have a run-on bevel on the outer periphery at their free end region as oriented in the throughflow direction, said bevel cooperating with a mating bevel on the support part 6 in order to convert an application of pressure in the axial direction into a radial constriction movement.

Figure 17:
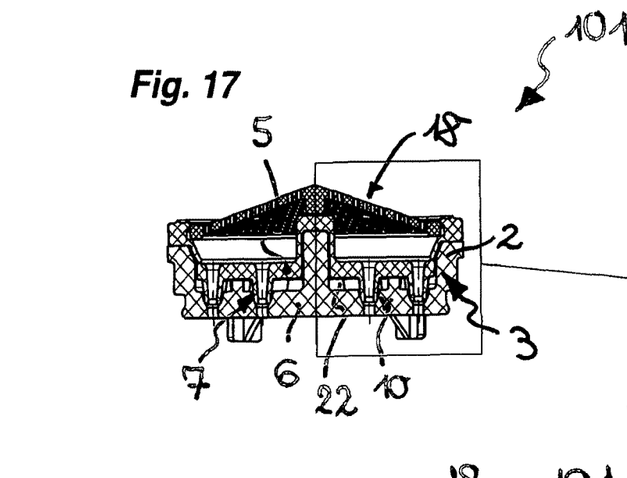
FIG. 17 shows a further exemplary embodiment of the inflow-side housing part comparable to FIG. 7 and connected to the functional element serving as a jet splitter.
Figure 18:
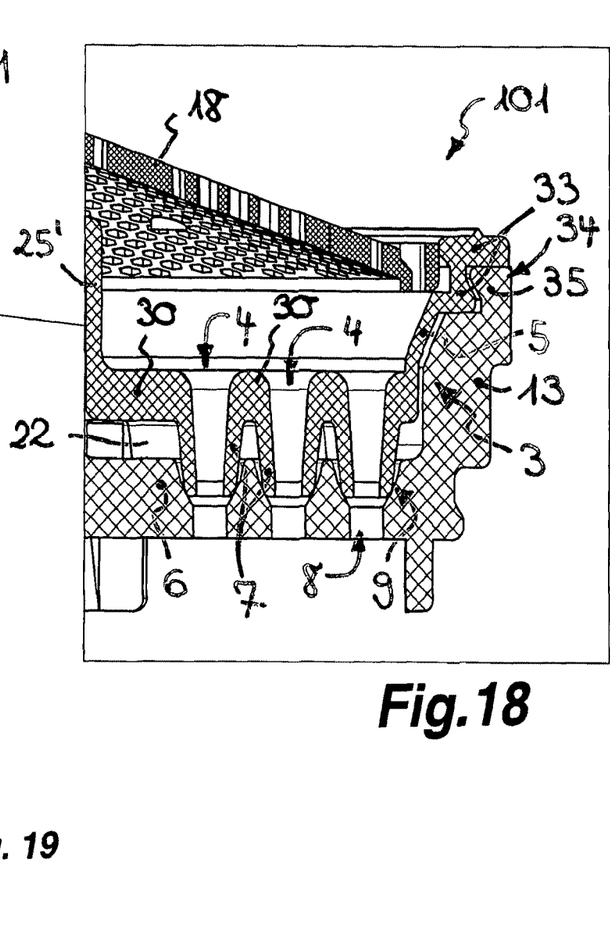
FIG. 18 shows the housing part from FIG. 17 in a detailed longitudinal section in the region indicated in FIG. 17.
Figure 19:
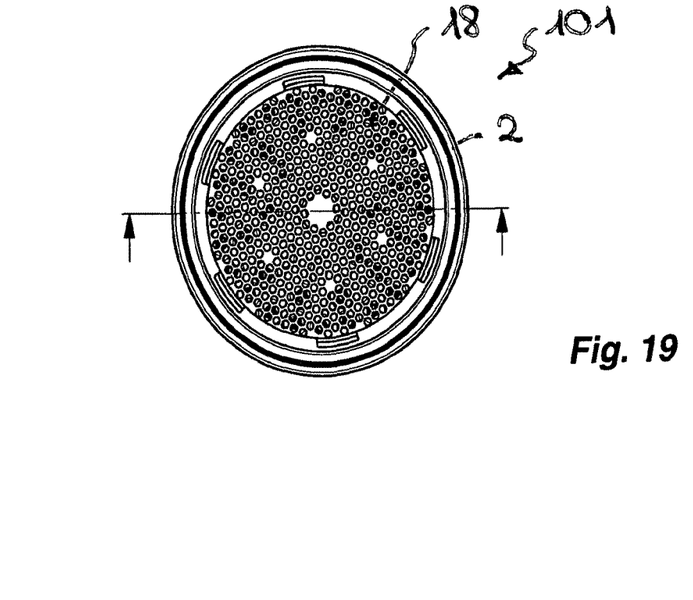
FIG. 19 shows the inflow-side housing part of the sanitary insert part according to FIGS. 17 and 18 formed as a jet regulator, said housing part being connected to the functional element serving as a jet splitter, wherein the plane of section of the longitudinal section shown in FIG. 17 is indicated in FIG. 19.

It can be seen in FIGS. 1 to 8 and in FIGS. 17 to 18 and in particular in FIGS. 5 and 18 that, for this purpose, each insert orifice 8 is tapered, preferably conically, in the throughflow direction in such a way that an axial feed movement of the nozzle-shaped formations 7 can be converted into a radial constriction movement at least in the free end region of these formations 7. The peripheral wall of the support part 6 delimiting an insert orifice 8 tapers conically for this purpose at the outflow-side end region thereof in such a way that the peripheral wall in this sub-region of the insert orifice 8 forms a mating bevel 9, which, in the event of a pressure-induced axial feed movement of the functional part 5 and of the formations 7 formed integrally thereon, deforms inwardly the free end regions, tapering conically so as to form a run-on bevel, of each formation 7 within the sense of a constriction movement.

In the exemplary embodiment 100 shown in FIGS. 9 to 16, the nozzle-shaped formations 7 by comparison have a shaping that is flexible in the axial direction and thus additionally also has a reduced component part stiffness in such a way that an axial compression of the nozzle-shaped formations 7 can be converted into a radial constriction movement in the region of the formations 7. The peripheral walls of the exemplary embodiment 100 shown in FIGS. 9 to 16, said walls forming the formations 7, also have a shaping that converts an application of pressure, caused by the water pressure, in the axial direction into a radial constriction movement of these peripheral walls The peripheral walls provided in the exemplary embodiment 100, said walls each delimiting a throughflow orifice 4, for this purpose have a constriction 10 with a peripheral bending zone 31 protruding into the throughflow orifice 4, and, in the event of an axial compression of the formations 7, cause a radial movement of this bending zone 31 in the clear orifice cross section of the throughflow orifice 4 concerned and thus define a radial constriction movement in the region of the central constrictions 10. In order to promote an axial compression of the formations 7 formed integrally on the functional part 5, the free end edge of each formation 7 rests on a stop of the support part 6, said stop being formed here as a stop flange or stop face 11.

From a comparison of FIGS. 5 and 8 on the one hand and of FIGS. 13 and 16 on the other hand, it can be seen that the inflow-side end edge 12 of the insert orifice 8 in the support part 6, said insert orifice receiving a formation 7, forms a stop, which delimits the pressure-induced axial relative movement of the functional part 5. Whereas the functional part 5 is located in the open position of the orifice cross section at a distance above the end edge 12 serving as a stop, the functional part 5 in the minimum position of the orifice cross section rests on this end edge 12, whereby the constriction movement is delimited.

Figures 1, 2:
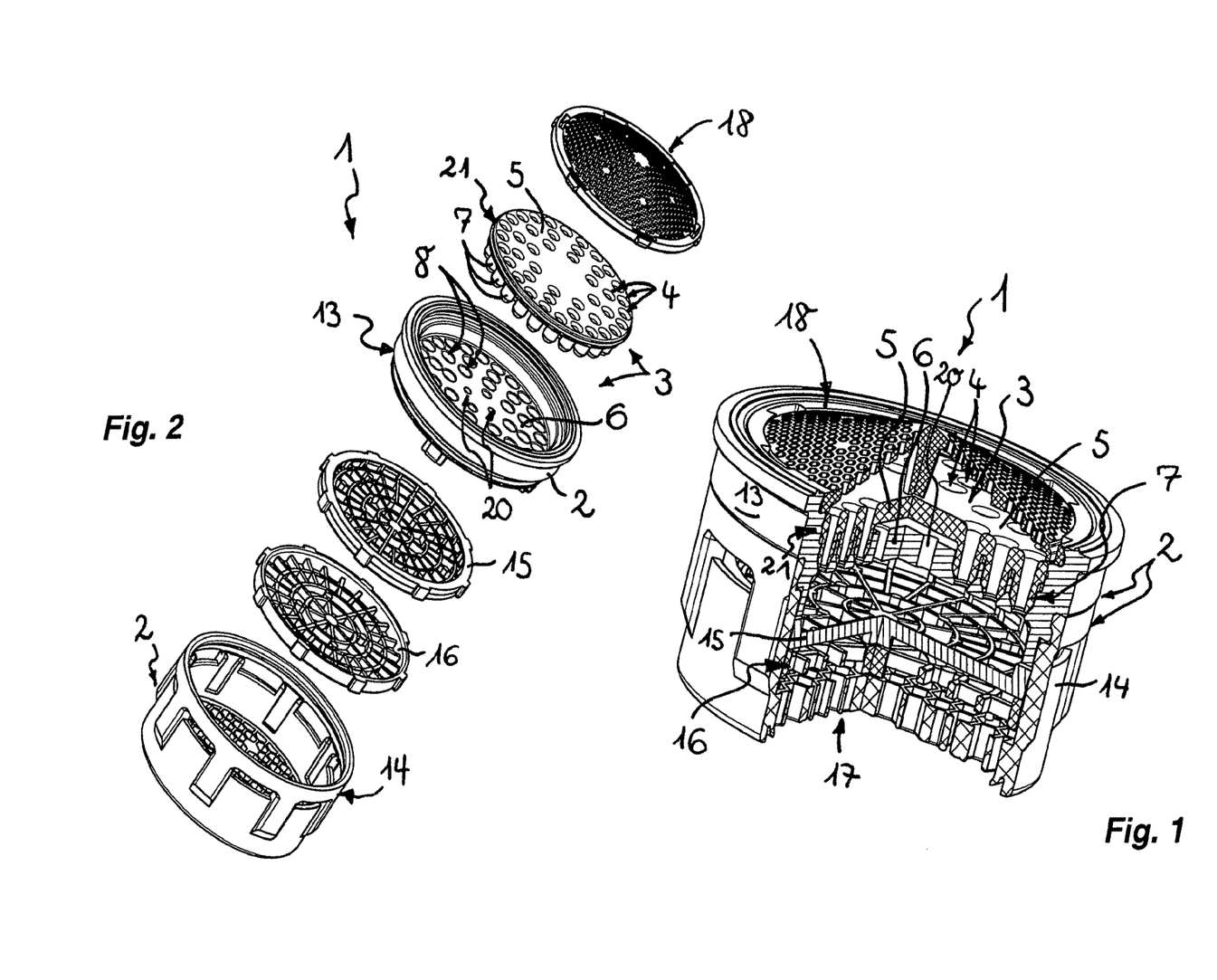
FIG. 1 shows a partly cut-away perspective illustration of a sanitary insert part embodied as a jet regulator having an insert housing, in the housing interior of which a functional element serving as a jet splitter is provided and has an outflow-side support part and an inflow-side functional part made of material that is resilient by comparison, a plurality of formations each delimiting a throughflow orifice being formed integrally on said functional part and in each case protruding into an inflow-side molded portion in the support part in such a way that an axial feed movement can be converted into a radial constriction movement in the free end region of any formation.
FIG. 2 shows an exploded perspective illustration of the constituent parts of the insert part from FIG. 1.
Figures 9, 10:
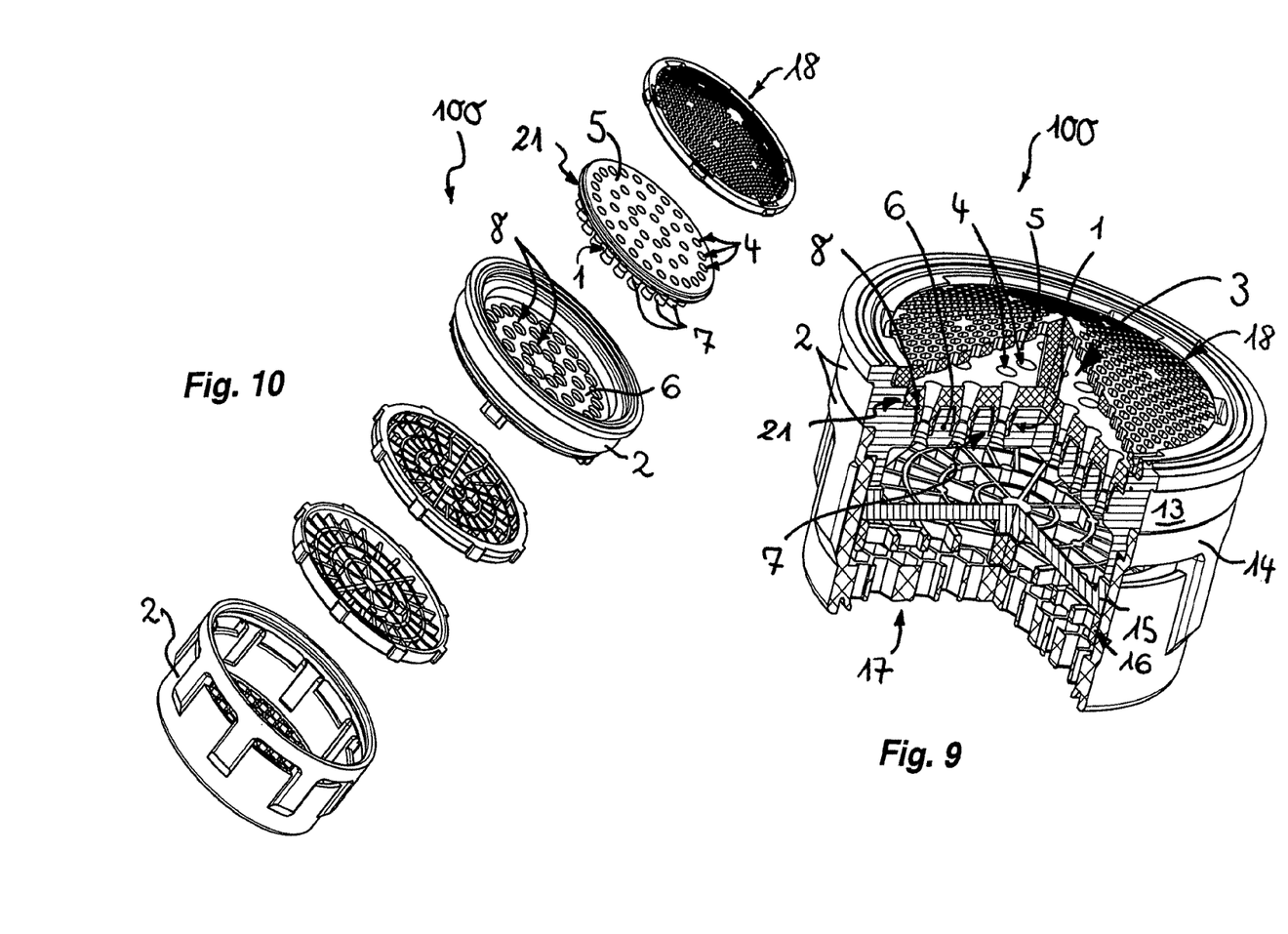
FIG. 9 shows a sanitary insert part, formed comparably with FIGS. 1 to 8 and likewise shown here in a partly cut-away perspective illustration, in which the nozzle-shaped designs formed integrally on the functional part of the functional element have a shaping that is flexible in the axial direction and thus has a reduced component part stiffness in such a way that an axial compression of the nozzle-shaped formations can be converted into a radial constriction movement in the region of these formations.
FIG. 10 shows an exploded perspective illustration of the constituent parts of the sanitary insert part from FIG. 9.

It can be seen in FIGS. 1 and 9 that the insert parts 1, 100, 101 are formed here as aerated jet regulators, of which the purpose is to form a consolidated complete jet. Here, the functional element 3 of the insert parts 1, 100, 101 formed as jet regulators is formed as a jet splitter that controls the throughflow rate. At least one aeration opening 32 is provided on the housing periphery of the insert housing 2 on the outflow side of the functional element 3 serving as a jet splitter and connects the housing interior of the insert housing 2 to the ambient air. Since a negative pressure is produced on the outflow side of the jet splitter when water flows through the throughflow orifices 4, the ambient air is drawn into the housing interior of the insert housing 2 through the at least one aeration opening 32, where it is then formed, with the water flowing through, into an effervescent water jet. Here, the support part 6 of the functional element 3 formed as a jet splitter is formed integrally in one piece on an inflow-side housing part 13 of the insert housing 2. The inflow-side housing part 13 is connectable, here detachably, to an outflow-side housing part 14; it is also possible however to interconnect the housing parts 13 and 14 non-detachably, for example by adhesive bonding or ultrasonic welding. The functional part 5 borne by the support part 6, said functional part being inserted into the housing part 13 from the inflow side and also possibly being formed as a resilient covering, comprises a sealing lug 21 on its peripheral edge, said sealing lug being intended to prevent an undesired penetration of leakage water into the gap located between the functional part 5 and support part 6.

The individual jets formed by the functional element 3 are accelerated in such a way that a negative pressure is produced on the outflow side of the functional element 3. Ambient air is drawn into the housing interior due to the negative pressure generated on the outflow side of the functional element 3 and can be mixed there with the individual jets. The individual jets mixed thoroughly with ambient air are then braked with the aid of the at least one insert part 15, 16 of a jet control arrangement, said insert parts 15, 16 being inserted from the inflow side into the sleeve-shaped outflow-side housing part 14. These insert parts 15, 16 of the jet control arrangement may have a grid or net structure formed of webs intersecting at crossing points. Once an outflow-side flow rectifier 17 has been passed, said rectifier forming the outlet end face of the housing part 14 and possibly having a honeycomb-cell-like orifice structure or likewise a grid or net structure, the outflowing water exits as a homogeneous, non-splashing and effervescent complete jet.

Since the channel opening 20 of the at least one ventilation channel penetrating the support part 6 is arranged on the outflow side of the support part 6, and since the water flowing through the throughflow orifices 4 generates a negative pressure in this region, the pressure difference with respect to the atmosphere is greatest in this region in order to promote the ventilating effect of the at least one ventilation channel.

The insert part 101 illustrated in FIGS. 17 to 20 corresponds largely in terms of its design to the exemplary embodiments 1, 100, shown in FIGS. 1 to 16. It can be clearly seen in FIGS. 17 and 18 that a gap 22 is provided between the functional part 5, which consists of resilient material, and the support part 6, which is dimensionally stable by comparison, and can be ventilated by means of the at least one ventilation channel, penetrating the support part 6 here. In the unloaded starting position shown in FIGS. 17 and 18, the disk- or plate-shaped main body of the functional part 5 is distanced from the support part 6, thus forming the gap 22. Under the pressure of the inflowing water, the main body of the functional part 5 approaches the support part 6, on the inflow side thereof, against the inherent resilience of the resilient material used therefore.

Here, the free end regions of the nozzle-shaped formations 7 are pressed against the peripheral wall of the associated insert hole 8 provided in the support part 6, said peripheral wall forming a mating bevel 9 and tapering conically, in such a way that this axial movement of the functional part 5 and the change in shape thereto produced as a result can be converted into a radial constriction movement of the at least one peripheral wall of the nozzle-shaped formation 7. said peripheral wall delimiting at least one throughflow orifice 4. With subsiding water pressure, the functional part 5 moves back into its starting position distanced from the support part 6, wherein the throughflow orifices 4 in the formations 7 again adopt their open position.

In order to exert a restoring force in the direction of the starting position onto the functional part 5 pressed by the water in the direction of the support part 6, the functional part 5 is held non-displaceably at its outer peripheral edge region in the insert housing 2. To this end, the functional part 5 rests via its outer peripheral edge region 33 on the adjacent inflow-side peripheral edge region 34 of the support part 6.

Figure 20:
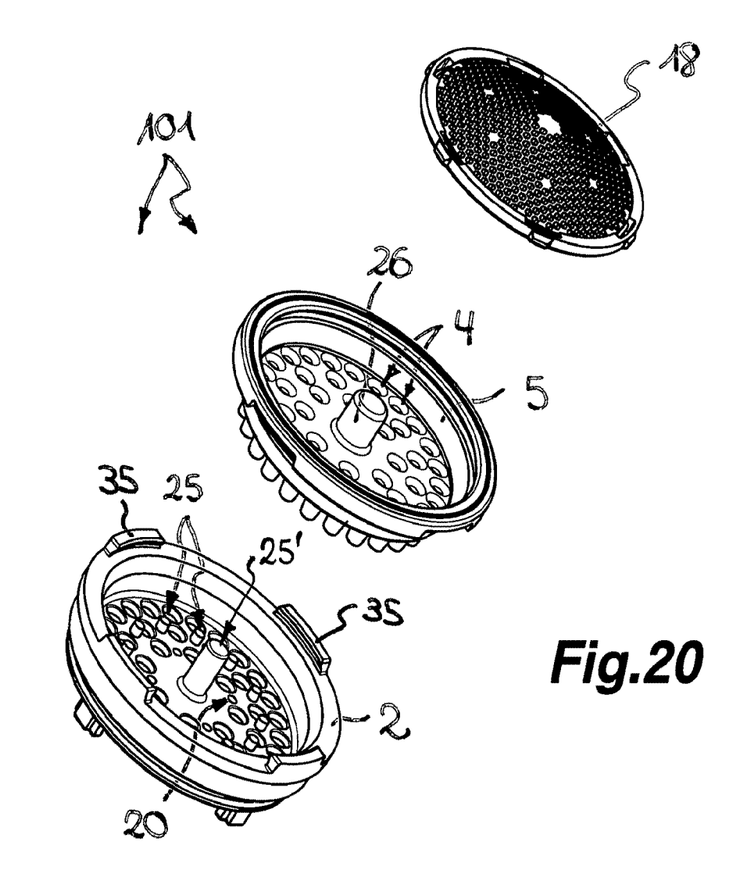
FIG. 20 shows a perspective view of the individual parts of the functional element from FIGS. 17 to 19 serving as a jet splitter.

It is clear from a comparison of FIGS. 18 and 20 that, as here, a plurality of spacers 25, 25' are preferably provided between the support part 6 and the functional part 5 and are formed integrally in one piece on the support part 6 on the inflow side. These spacers 25, 25' cause a resilient deformation, effective as restoring force, of the functional part 5 produced from resilient material, such that, with subsiding water pressure, a restoring force exerted by the inherent resilience of the functional part 5 is exerted onto the functional part 5 in the direction of the starting position, even in the regions of the pin-shaped spacers 25, 25'. Whereas the spacer 25' is arranged approximately centrally and protrudes in a centering manner into a hat-shaped formation 23 on the functional part 5, the other spacers 25' are arranged at the same distance from the central spacer 25' and at equal distances from one another. The peripheral edge region 33 of the resilient functional part 5 held non-displaceably in the insert housing 2 and the spacers 25, 25' acting on the resilient main body of the functional part 5 form a rubbery-elastic restoring force, which is effective in the direction of the starting position of the functional part 5. Here, the restoring force can be set by a pretension applied to the functional part 5 during installation in the insert housing 2. Such a pretension is produced for example with a deformed installation of the functional part 5 and in particular of the disk- or plate-shaped main body 30 thereof in the insert housing 2. It is also possible for the free ends of the spacers 25, 25' to be acted on by the functional part 5 and in particular by the main body 30 thereof only at an increased water pressure, whereby a gap is produced in the unloaded state between the free ends of the spacers 25, 25' and the main body 30 of the functional part 5, and whereby the desired restoring force is only activated in a delayed manner with increasing water pressure. Instead, it is also possible however for the functional part 5 to rest, in particular via its main body 30, on the free end faces of the spacers 25, 25', such that these spacers 25, 25', in the loaded region of the main body 30, cause a material extension or displacement with rising water pressure.

It is clear from FIG. 18 that the outer peripheral edge region 33 of the functional part 5 and the adjacent peripheral edge region 34 of the support part 6 can be fixed detachably to one another, such that the peripheral edge region 33 of the functional part 5 can act as a restoring tension spring on the function component 5. To this end, the outer peripheral edge region 33 of the functional part 5 engages under at least one undercut on the adjacent peripheral edge region 34 of the support part 6. The at least one undercut is provided here on a plurality of lug-shaped protrusions 35, which protrude beyond the inflow-side peripheral end edge of the support part. An inflow-side component part, which is formed here by an add-on screen 18, can be inserted into the functional part 5 in such a way that a detaching movement of the peripheral edge region of the functional part 5 engaging under the undercut is blocked.

The sanitary insert parts 1, 100, 101 are arranged downstream of the add-on screen 18, which is connected to the housing part 17 on the inflow side thereof. The shape of the peripheral walls provided in the throughflow-controlling functional element 3 and each delimiting a throughflow orifice 4 can be changed against a restoring force as a result of the pressure of the inflowing water in such a way that the throughflow orifices 4 have an orifice cross section which changes continually in accordance with the pressure of the inflowing water. Due to this flexibility of the functional element 3 produced at least in a sub-region 5 from resilient material, a calcification and contamination in this region of the insert parts 1, 100, 101 is counteracted. Since the functional part 5 rests in the minimum position of the orifice cross section on the end edge 12 of the support part 6 serving as a stop, the constriction movement of the throughflow orifices 4 is delimited, and a complete closure of these throughflow orifices 4 is avoided.

LIST OF REFERENCE SIGNS sanitary insert part 1
insert housing 2
functional element 3
throughflow orifice 4
(inflow-side) functional part (of the functional element 3) 5
support part 6
formation 7
insert orifice 8
mating bevel (on the insert orifice 8) 9
constriction 10
stop face 11
end edge (serving as stop) 12
(inflow-side) housing part 13
(outflow-side) housing part 14
insert part (of the jet control arrangement) 15
insert part (of the jet control arrangement) 16
(outflow-side) flow rectifier 17
add-on screen 18
channel opening 20
sealing lug 21
gap 22
spacer (on the support part 6) 25, 25'
formation 26
main body (of the functional part 5) 30
bending zone 31
aeration opening 32
peripheral edge region (on the functional part 5) 33
peripheral edge region (on the support part 6) 34
protrusions (as undercut on the support part 6) 35
sanitary insert part 100
sanitary insert part 101

The invention claimed is:

1. A sanitary insert part (1, 100, 101) comprising an insert housing (2), the insert housing (2) has in a housing interior thereof a functional element (3) that controls throughflow and that has a plurality of throughflow orifices (4), the throughflow orifices (4) delimited by a peripheral wall, a shape of which is changeable against a restoring force as a result of pressure of inflowing water such that the throughflow orifices (4) each have a variable orifice cross section which is changable, in accordance with the pressure of the inflowing water, between an open position and a minimum position having a reduced orifice cross section by comparison, wherein the functional element (3) is formed at least in two parts and comprises at least one functional part (5), comprising the at least one peripheral wall delimiting the throughflow orifices (4), and a support part (6) bearing the at least one functional part (5), the support part (6) comprising a plurality of insert orifices (8) each one individually coaxial with one of the throughflow orifices (4) and wherein the sanitary insert part (1, 100, 101) is formed as a jet regulator for a consolidated complete jet at the water outlet of a sanitary outlet fitting.

2. The insert part as claimed in claim 1, wherein the support part (6) is produced from a material that is at least one of dimensionally stable compared with the functional part (5) on an inflow side or has an at least partly higher component part stiffness by comparison.

3. The insert part as claimed in claim 1, wherein a water pressure acting on an inflow side of the functional element (3) at least in a region of the at least one throughflow orifice (4) in a throughflow direction causes a height reduction of the functional element (3) that is convertible into a radial constriction movement of the at least one peripheral wall delimiting the at least one throughflow orifice (4).

4. The insert part as claimed in claim 1, wherein a water pressure acting on an inflow side of the functional element (3) at least in a region of the at least one throughflow orifice (4) in the throughflow direction causes a change in shape of the functional part (5) or a material displacement at the functional part (5) that is convertible into a radial constriction movement of the at least one peripheral wall delimiting the at least one throughflow orifice (4).

5. The insert part as claimed in claim 4, wherein the change in shape or material displacement caused by the water pressure is an at least partial thickness reduction, cross section reduction, height reduction or compression of the functional part.

6. The insert part as claimed in claim 1, wherein the at least one peripheral wall delimiting one of the throughflow orifices (4) has a shaping that converts an application of pressure, caused by the water pressure, in an axial direction into a radial constriction movement of said peripheral wall.

7. The insert part as claimed in claim 6, wherein to convert an application of pressure in the axial direction into a radial constriction movement, the at least one peripheral wall delimiting the throughflow orifice (4) either has, on an outer periphery at a free end region thereof as oriented in the throughflow direction, a run-on bevel that cooperates with a mating bevel (9) on the support part (6), or has a constriction (10) with a peripheral bending zone (31) protruding into the throughflow orifice (4).

8. The insert part as claimed in claim 1, wherein the at least one peripheral wall delimiting the at least one throughflow orifice (4) is formed as a nozzle-shaped formation (7) of the functional part (5).

9. The insert part as claimed in claim 8, wherein the at least one nozzle-shaped formation (7) of the functional part (5) dips into an insert orifice (8) in the support part (6).

10. The insert part as claimed in claim 9, wherein the at least one insert orifice (8) tapers in the throughflow direction such that an axial feed movement of the nozzle-shaped formation (7) is convertible into a radial constriction movement in the region of the formation (7).

11. The insert part as claimed in claim 8, wherein the at least one nozzle-shaped nozzle (7) has a shaping that is flexible in the axial direction such that an axial compression of the nozzle shaped formation (7) is convertible into a radial constriction movement in a region of the formation (7).

12. The insert part as claimed in claim 10, wherein a relative movement, convertible into the radial constriction movement of the at least one peripheral wall delimiting the at least one throughflow orifice (4), between the functional part (5) and the support part (6) of the functional element (3) is delimited by at least one stop.

13. The insert part as claimed in claim 9, wherein an inflow-side end edge (12) of the insert orifice (8) in the support part (6) delimits a pressure-induced axial relative movement of the functional part (5).

14. The insert part as claimed in claim 9, wherein the functional part (5) has a plurality of the nozzle-shaped formations (7) on the outflow side and the outflow side of the functional part (5) and an adjacent flat side of the support part (6) are matched to one another in terms of their shape.

15. The insert part as claimed in claim 1, wherein the functional element (3) of the insert part (1, 100, 101) formed as the jet regulator is formed as a jet splitter that controls a throughflow rate.

16. The insert part as claimed in claim 15, wherein the sanitary insert part (1, 100, 101) is formed as an aerated jet regulator, and at least one aeration opening (32) is provided on an outflow side of the jet splitter on a housing periphery of the insert housing (2) and connects a housing interior of the insert housing (2) to the ambient air.

17. The insert part as claimed in claim 1, wherein a gap (22) provided between the functional part (5) and the support part (6) is connected via at least one ventilation channel to ambient air and the at least one ventilation channel penetrates the support part (6) and has a channel opening (20), which is provided on an outflow side of the support part (6).

18. The insert part as claimed in claim 1, wherein the functional part (5) rests, via an outer peripheral edge region (33) thereof, on an adjacent peripheral edge region (34) of the support part (6).

19. The insert part as claimed in claim 9, wherein the at least one insert orifice (8), in its conically tapering orifice portion, has slide formations that are distanced from one another in a peripheral direction and are acted on by a free end region of the nozzle-shaped formation (7) of the functional part (5).

\* \* \* \* \*